United States Patent [19]

Kohyama

[11] Patent Number: 4,697,664
[45] Date of Patent: Oct. 6, 1987

[54] SCOOTER TYPE MOTORCYCLE

[75] Inventor: Mikihiro Kohyama, Saitama, Japan

[73] Assignee: Honda Giken Kogyo Kabushiki Kaisha, Tokyo, Japan

[21] Appl. No.: 777,470

[22] Filed: Sep. 18, 1985

[30] Foreign Application Priority Data

Sep. 18, 1984 [JP] Japan .................. 59-193859

[51] Int. Cl.⁴ .......................................... B62K 11/04
[52] U.S. Cl. .................... 180/226; 180/227; 180/230
[58] Field of Search .............. 180/205, 219, 223, 226, 180/227, 229, 230, 231

[56] References Cited

U.S. PATENT DOCUMENTS

| 1,362,024 | 12/1920 | McKee | 180/219 |
| 1,952,091 | 3/1934 | Nicholson | 180/226 |
| 3,592,284 | 7/1971 | Mennesson | 180/226 |
| 3,884,316 | 5/1975 | Bowers | 180/230 |
| 4,345,664 | 8/1982 | Anno et al. | 180/230 |
| 4,436,173 | 3/1984 | Takahashi | 180/226 |
| 4,567,958 | 2/1986 | Ishihara | 180/230 |

FOREIGN PATENT DOCUMENTS

| 1126266 | 3/1962 | Fed. Rep. of Germany | 180/227 |
| 1537233 | 12/1978 | United Kingdom | 180/229 |

*Primary Examiner*—John J. Love
*Assistant Examiner*—Charles R. Watts
*Attorney, Agent, or Firm*—Lyon & Lyon

[57] ABSTRACT

A scooter having a low bed footboard, a rear cover rearwardly of said footboard and a front cover forwardly of said footboard. An engine is located beneath the forward portion of the footboard. A variable diameter pulley V-belt transmission is located beneath the rear cover and is pivotally mounted to provide a swing arm rear suspension. A drive shaft extends between the engine and the transmission beneath the footboard. A storage compartment is positioned within the rear cover beneath a seat. A fuel tank is located within the front cover generally above the engine.

16 Claims, 8 Drawing Figures

SCOOTER TYPE MOTORCYCLE

BACKGROUND OF THE INVENTION

The field of the present invention is motor scooters and more particularly the drive train arrangement therefor.

A traditional scooter design has included a general arrangement as illustrated in FIG. 1 with a low bed footboard 02, a rear cover 03 supported by a rear body frame 04 and a front body cover defining a leg shield. The body is suspended by a front wheel FW and a rear wheel RW. The scooter disclosed in FIG. 1 includes a unitary swing-type power unit 05 pivotally mounted to the body frame so as to move through angle A. A cylinder 06 extends upwardly as part of the unitary swing-type power unit 05. The rear portion of the power unit 05 is coupled with a coil spring 07 extending upwardly to the rear body frame 04. Contained beneath the seat of the vehicle and above the unitary swing type power unit 05 may be a fuel tank T, a battery B and an oil tank OL.

Such conventional arrangements as illustrated in FIG. 1 exhibit certain disadvantages. The center of gravity of such devices is further aft and higher than may be desired. The space within the rear body is limited so as to accommodate the power unit and the spring suspension system. Cooling may also become a problem with the power unit located within the rear body cover.

SUMMARY OF THE INVENTION

The present invention is directed to a scooter type vehicle having a low bed footboard between front and rear covers. The engine of the vehicle is located under the forward portion of the low bed footboard with the drive train extending rearwardly to drive the rear wheel of the vehicle. A power transmission means may extend rearwardly from the engine to a transmission located beneath the rear cover.

The engine and drive train arrangement of the present invention may enhance the balance of the vehicle by moving the center of gravity forwardly and downwardly to a more central position of the vehicle. By moving the center of gravity downwardly, the tipping moment can be reduced such that the vehicle is more easily walked or pushed. Additional items may also be carried high on the vehicle without raising the center of gravity to an inconvenient position as would result with more conventional designs. Additionally, the space previously required for the unitary swing-type power unit may be devoted to storage with the present invention. Further, the location of the engine may promote air cooling thereof and provide easy access for service.

Accordingly, it is an object of the present invention to provide an improved scooter type vehicle having an advantageous engine and power train arrangement. Other and further objects and advantages will appear hereinafter.

DETAILED DESCRIPTION OF THE PREFERRED EMBODIMENT

Figure 3:
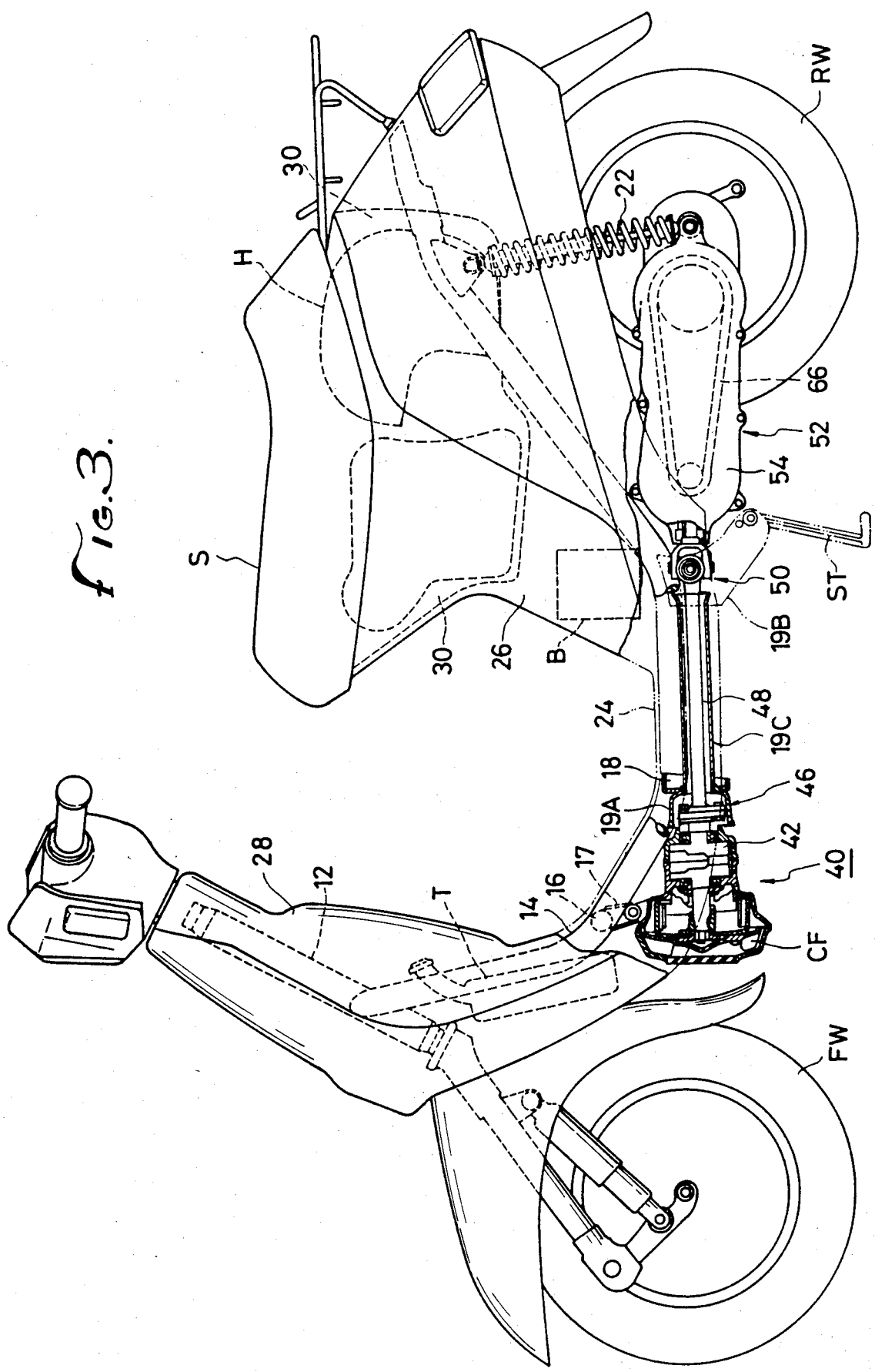
FIG. 3 is a side view illustrating the power train in cross section of a scooter-type vehicle of the present invention.

Turning in detail to the drawings, a scooter type vehicle 10 is illustrated as including a frame structure having a head pipe 12 and main pipes 14 extending downwardly from the head pipe 12, rearwardly to the rear cover of the vehicle and then upwardly as can best be seen in the side view of FIG. 3. Extending between the main pipes 14 is a cross pipe 16 to which an engine mounting plate 17 is attached. A cross member 18 also extends between the main pipes 14.

Figure 4:
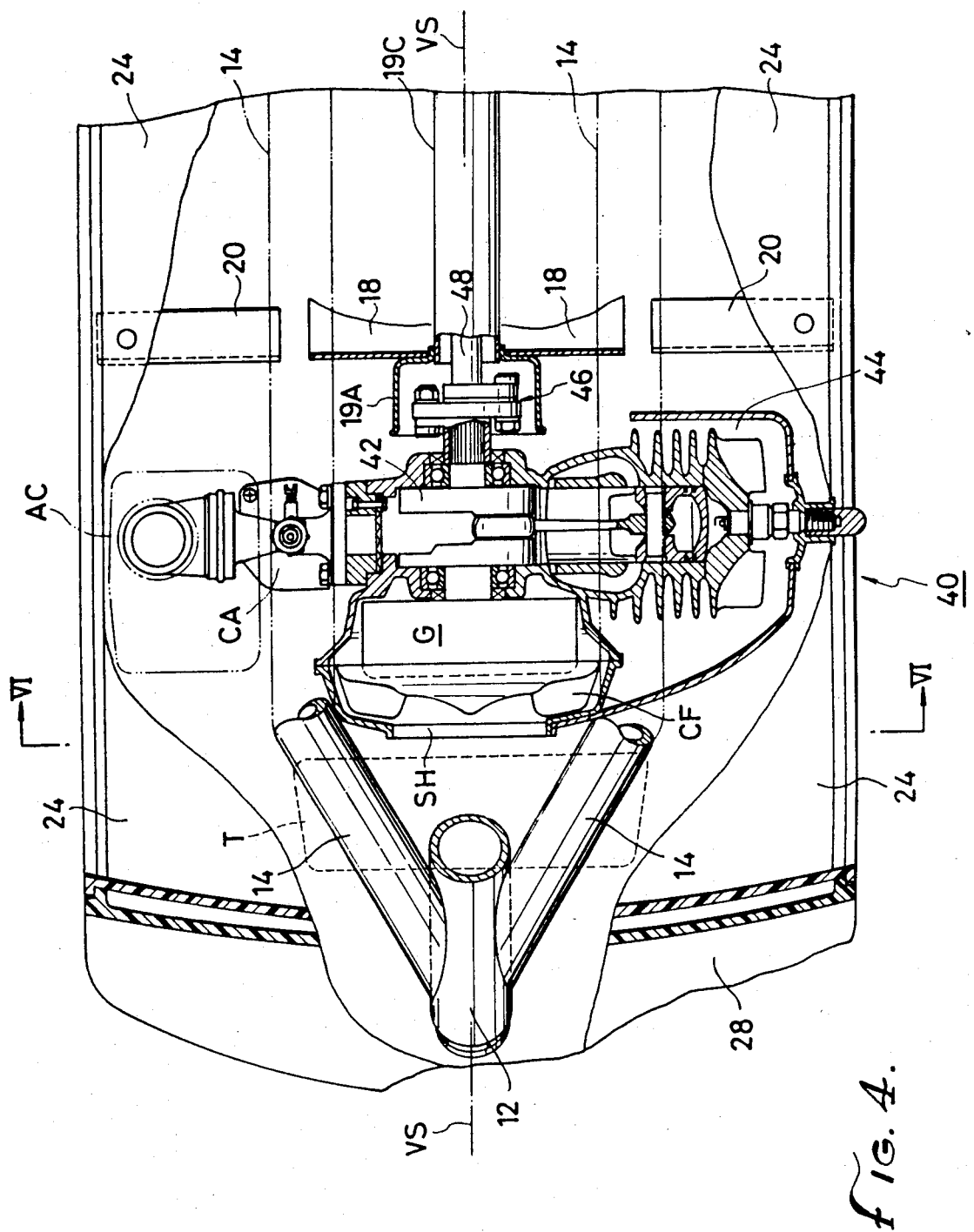
FIG. 4 is a plan view of the low bed footboard portion of the present invention with a portion thereof removed to illustrate the engine in cross section.

Centrally located between the main pipes 14 and supported by the cross member 18 is a drive train cover including a cup-type body 19A as best seen in FIG. 4, a rear bracket 19B, also extending between the main pipes 14 and a central protective tube 19C.

Extending transversely of the vehicle from the main tubes 14 are support plates 20. There are four support plates 20 illustrated in FIGS. 4 and 5. Supported on the support plates 20 is a footboard 24. In the present invention, the footboard 24 is shown to be comprised of two flat portions to either side of a slightly raised center area all forming a low bed footboard. The footboard forms a portion of the body of the vehicle also including a rear cover 26 to which the footboard is affixed and a front cover 28 to which the footboard 24 is also affixed. The front cover 28 extends forwardly of the footboard 24 while the rear cover 26 extends rearwardly thereof. The forward portion of the footboard 24 extends forwardly and upwardly to meet the front cover 28. In this way, the footboard 24 provides both a flat area and a somewhat inclined area for the operator's feet.

Figure 1:
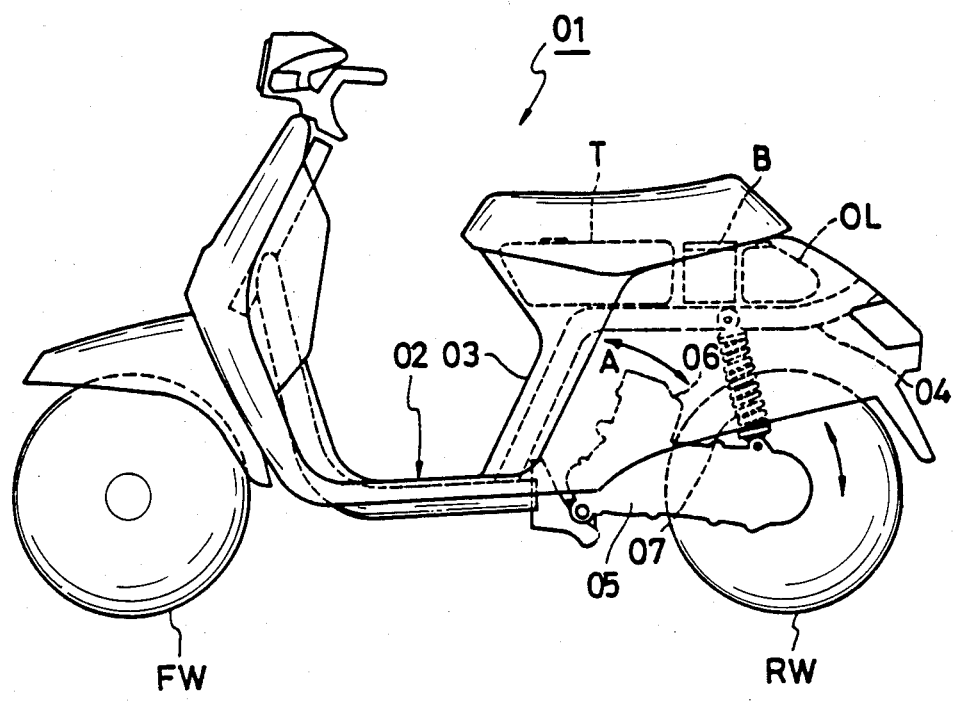
FIG. 1 is a side elevation of a prior art scooter type vehicle.
Figure 2:
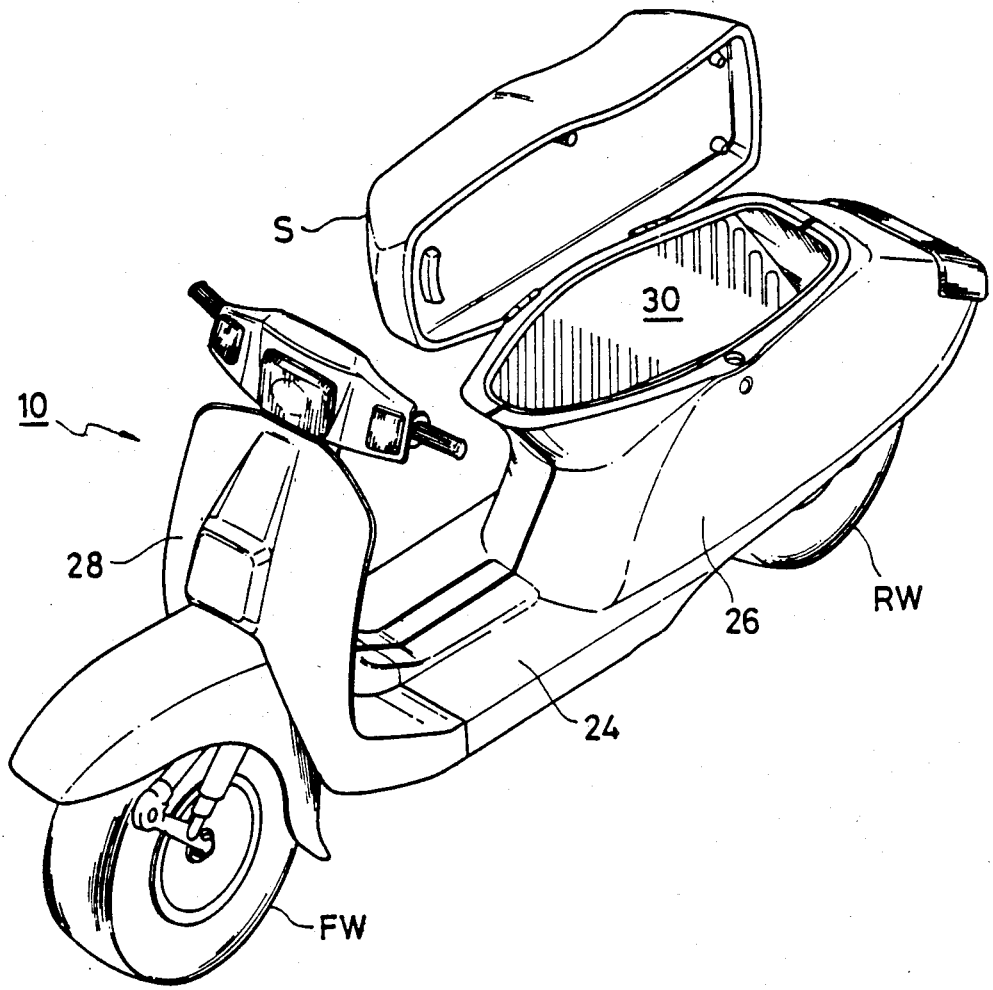
FIG. 2 is an oblique view of a scooter type vehicle of the present invention.

The rear cover 26 is supported by the main pipes 14 extending rearwardly and upwardly beneath the rear cover 26. A seat S is supported on the rear cover 26 and is shown in FIG. 2 to be hinged to expose a storage cavity 30. As can best be seen in FIG. 3, the storage cavity 30 is substantial and may accommodate a helmet H as well as other stored goods.

Also located within the body is a fuel tank T within the front cover 28 and a battery B within the rear cover 26.

Located beneath the forward portion of the footboard 24 is an engine 40. The engine 40 includes a crankshaft 42, a two-cycle engine cylinder 44 having a piston coupled with the crankshaft 42. A coupling bracket 46 is also coupled with the crankshaft 42 to provide output power. Coupled to the forward end of the crankshaft 42 is a generator G including a cooling fan CF associated with the outer rotating portion of the generator G. A carburetor CA having an air cleaner AC is located diametrically opposed in the first embodiment across the crankshaft 42 from the cylinder 44. As the engine is a two stroke crankcase compression engine, the carburetor may be coupled with the crankcase as illustrated. The cylinder 44 and carburetor CA in the embodiment illustrated in FIG. 4 extend transversely of the vehicle to occupy the least amount of vertical space. This arrangement is also illustrated in FIG. 6 to show the compact nature of the engine 40 beneath the footboard 24. Extending rearwardly from the coupling bracket 46 is a connecting rod or drive shaft 48. This drive shaft extends through the protective tube 19C to within the bracket portion 19B. It can be seen in each of FIGS. 4 and 5 that the drive shaft 48 extends along the vertical central plane VS of the vehicle.

Figure 5:
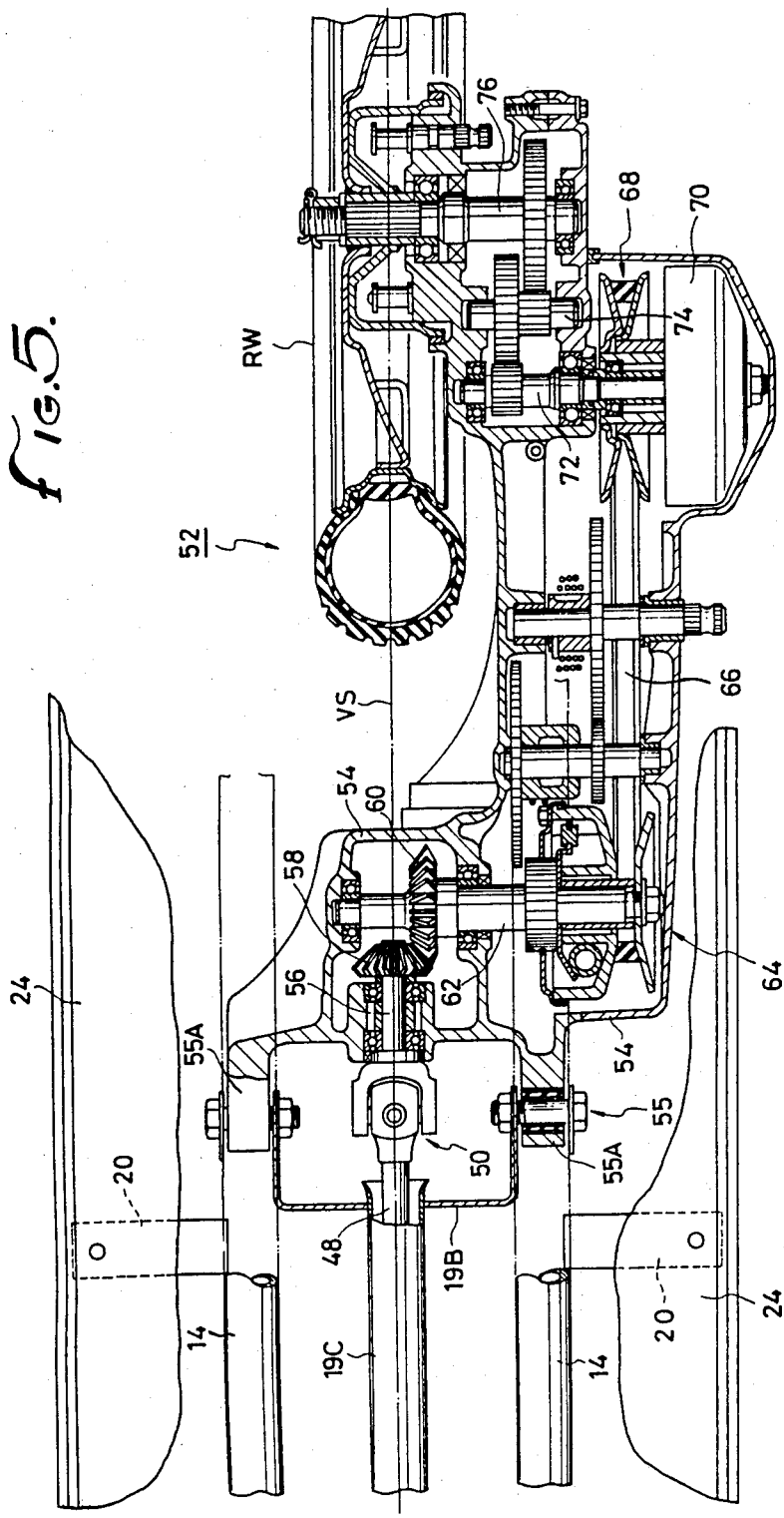
FIG. 5 is a cross-sectional plan view through the transmission of the present invention.
Figure 6:
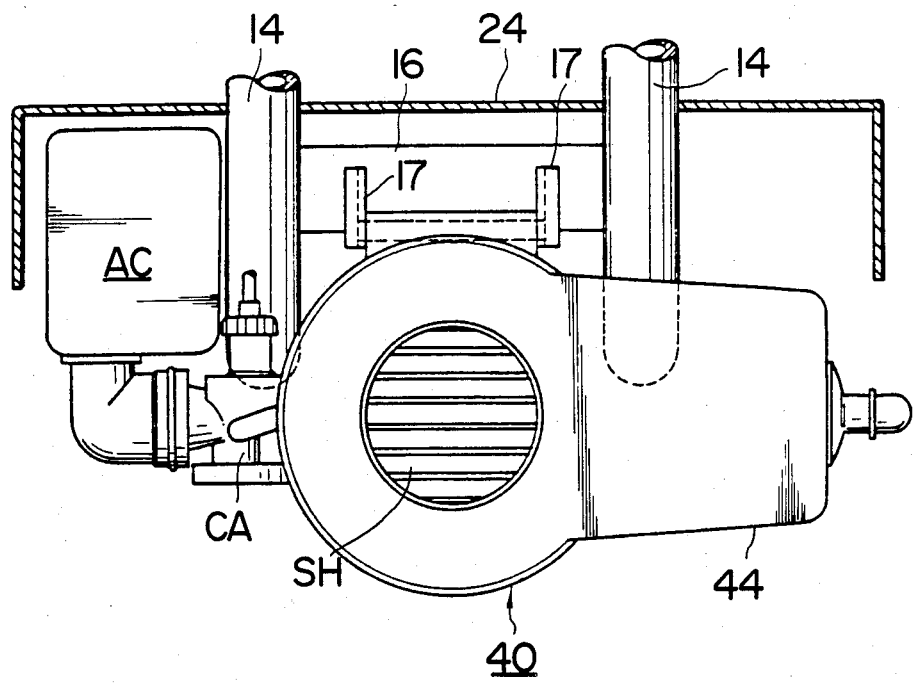
FIG. 6 is a front elevation of the engine of the present invention as taken along line VI—VI of FIG. 4.

Looking to FIG. 5, the connecting rod or drive shaft 48 extends rearwardly to a universal coupling 50 which in turn is coupled with a transmission 52. The transmission 52 includes a transmission housing 54 which is pivotally mounted to the bracket 19B which is in turn supported by the main pipes 14. The housing 54 extends forwardly to a front pivot assembly 55 including two bearing supports 55A. The bearing supports 55A accommodate bearings surrounding pivot shafts defined by bolts associated with the bracket 19B and further supported by the main pipes 14. By virtue of the forward pivot assembly 55, the transmission housing may pivot about a transverse axis to provide a rear swing-arm suspension. A coil spring 22 is coupled with both the transmission 52 and the frame of the vehicle to provide cushion support.

The universal coupling 50 is coupled with a middle shaft 56 rotatably fixed within the transmission housing 52 by bearings. Bevel gears 58 and 60 transmit power to an input shaft 62 which is also rotatably mounted within the transmission housing 54. The axis of the input shaft 62 extends transversely to the vehicle. A variable diameter V-belt pulley transmission is then coupled with the input shaft 62 and includes a driving pulley 64, a V-belt 66 and a driven pulley 68. The driving pulley 64 is shown to have centrifugal control to increase the effective diameter of the drive pulley 64 with increased speed of the input shaft 62.

Coupled with the output pulley 68 is a centrifugal clutch 70. The output of the centrifugal clutch 70 is coupled with a main shaft 72 which, through a series of gears, is coupled with an intermediate shaft 74 and a rear drive shaft 76. The rear drive shaft 76 is rotatably mounted within the rear portion of the transmission housing 54 to rotatably support a hub and a rear wheel RW.

Thus, in the embodiment specifically illustrated in FIGS. 3, 4, 5 and 6, a device is disclosed having a transversely mounted engine 40 mounted under the forward portion of the footboard 24. A power transmission means extends beneath the footboard 24 rearwardly to a transmission 52 located between the rear cover 26. The transmission 52 is pivotally mounted relative to the vehicle to form a rear swing arm suspension and transmission unit. Thus, the power train is located low on the vehicle with the weight distributed forwardly of that of a conventional scooter arrangement. The forward position of the engine 40 also provides for additional storage capacity beneath the seat S and enhanced cooling with the cooling fan CF cooperating with a protective housing having a screen SH to direct cool air to the cooling fan CF and eventually to the cylinder 44.

Figure 7:
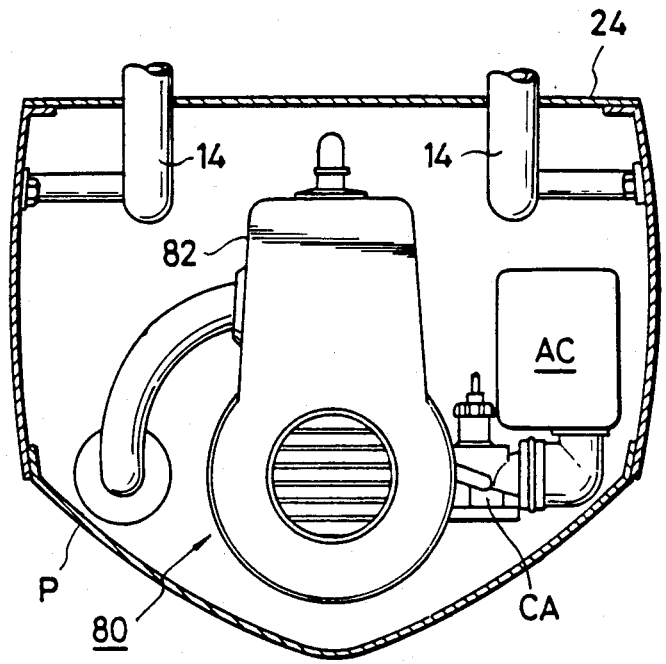
FIG. 7 is an alternate embodiment of an engine of the present invention as taken along line VI—VI of FIG. 4.
Figure 8:
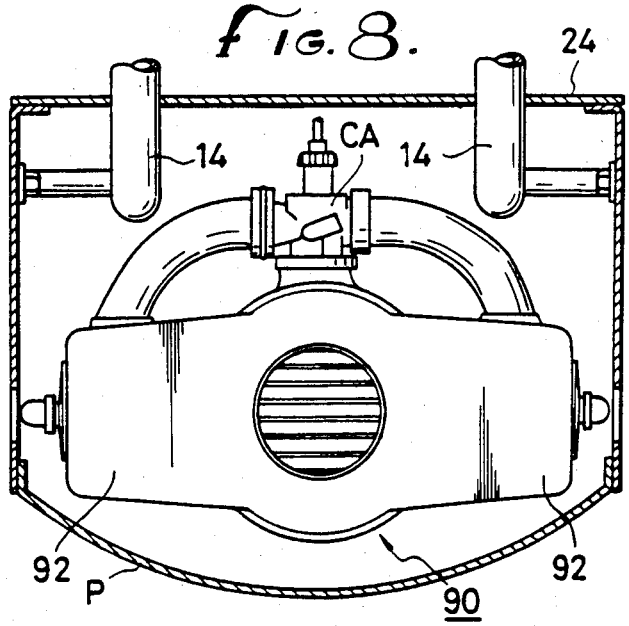
FIG. 8 is yet another embodiment of the present invention as taken along line VI—VI of FIG. 4.

Alternate engine configurations are illustrated in FIGS. 7 and 8. In FIG. 7, the carburetor CA and air cleaner AC are located laterally of the engine while the cylinder 82 of the engine 80 extends vertically beneath the forward portion of the footboard 24. A protective plate P may be employed in such an arrangement to protect the underside of the engine 80.

In FIG. 8, a two-cylinder engine 90 is illustrated with two cylinders 92. The cylinders extend transversely of the vehicle with the carburetor CA located above the engine 90. Again, a protective plate P may extend beneath the engine 90 for protection from below.

Thus, an improved scooter arrangement is illustrated. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A scooter comprising
   a body having a low bed footboard, a rear cover rearwardly of said low bed footboard and a front cover forwardly of said low bed footboard;
   a engine fixed beneath a forward position of said low bed footboard;
   a transmission beneath said rear cover rearwardly of said low bed footboard;
   a power transmission means including a drive shaft for conveying power from said engine to said transmission extending between said engine and said transmission beneath said low bed footboard, siad engine including a crankshaft and a cylinder, the axis of said crankshaft extending substantially longitudinally of said body and the axis of said cylinder extending substantially transversely of said body; and
   said transmission being pivotably mounted about a transverse axis located substantially between said power transmission means and said transmission.

2. The scooter of claim 1 wherein the forward portion of said low bed footboard is upwardly inclined toward said front cover.

3. The scooter of claim 1 wherein said engine is a two-stroke, crankcase compression engine and further includes a carburetor transversely arranged to a side of said crankshaft opposite from said cylinder.

4. The scooter of claim 1 wherein said power transmission drive shaft extends through a protective tube.

5. The scooter of claim 1 wherein said transmission is a variable diameter pulley V-belt transmission.

6. The scooter of claim 1 further comprising a fuel tank in said front cover, above said engine.

7. The scooter of claim 1 further comprising a storage compartment within said rear cover above said transmission.

8. The scooter of claim 1 wherein said engine includes two cylinders, said crankshaft having an axis, said crankshaft axis extending substantially longitudinally of said body, said cylinders being opposed, said opposed cylinders having an axis, said cylinder axis extending substantially transversely of said body.

9. A scooter comprising
   a body having a low bed footboard, a rear cover rearwardly of said low bed footboard and a front cover forwardly of said low bed footboard;
   an engine fixed beneath the forward portion of said low bed footboard;
   a transmission beneath said rear cover rearwardly of said low bed footboard;
   a power transmission means for conveying power from said engine to said transmission extending between said engine and said transmission beneath said low bed footboard; said engine including a crankshaft and a cylinder, the axis of said crankshaft extending substantially longitudinally of said body and the axis of said cylinder extending substantially transversely of said body; and said transmission being pivotably mounted about a transverse axis located substantially between said power transmission means and said transmission.

10. The scooter of claim 9 wherein said engine is a two-stroke, crankcase compression engine and further includes a carburetor transversely arranged to a side of said crankshaft opposite from said cylinder.

11. The scooter of claim 9 wherein said transmission is a variable diameter pulley V-belt transmission.

12. The scooter of claim 11 further comprising a storage compartment within said rear cover above said transmission.

13. A scooter comprising a body having a low bed footboard, a rear cover rearwardly of said low bed footboard and a front cover forwardly of said low bed footboard;

an engine fixed beneath the forward position of said low bed footboard;

a transmission beneath said rear cover rearwardly of said low bed footboard;

a power transmission means for conveying power from said engine to said transmission and including a drive shaft extending between said engine and said transmission beneath said low bed footboard; and said transmission being pivotably mounted about a transverse axis located substantially between said power transmission means and said transmission.

14. The scooter of claim 13 wherein said transmission is a variable diameter pulley V-belt transmission.

15. The scooter of claim 14 further comprises a storage compartment within said rear cover above said transmission.

16. The scooter as claimed in either claims 1, 9 or 13 including cooling fan means for the engine, said fan means being located forwardly of the engine.

* * * * *

UNITED STATES PATENT AND TRADEMARK OFFICE
CERTIFICATE OF CORRECTION

PATENT NO. : 4,697,664
DATED : October 6, 1987
INVENTOR(S) : KOHYAMA, Mikihiro

It is certified that error appears in the above-identified patent and that said Letters Patent is hereby corrected as shown below:

Column 4, line 20, change "a" to --an--.
Column 4, line 27, change "siad" to --said--.

Signed and Sealed this

First Day of February, 2000

Attest:

Q. TODD DICKINSON

*Attesting Officer*    *Acting Commissioner of Patents and Trademarks*